United States Patent [19]
Järvinen

[11] 3,887,955
[45] June 10, 1975

[54] HEADLIGHT WIPER

[76] Inventor: Uro Tapio Järvinen, Satunavagen 18, Marsta, Sweden, 19500

[22] Filed: Apr. 9, 1974

[21] Appl. No.: 459,306

[30] Foreign Application Priority Data
Apr. 10, 1973 Sweden............................ 73050346

[52] U.S. Cl. ......... 15/250.22; 15/250.24; 15/250 A
[51] Int. Cl. ............................ B60s 1/20; B60s 1/44
[58] Field of Search....... 15/250.22, 250.24, 250.25, 15/250.26, 250 A, 250.01, 250.04

[56] References Cited
UNITED STATES PATENTS

| 1,162,122 | 11/1915 | Yamada et al. | 15/250.22 |
| 1,689,163 | 10/1928 | Sukert | 15/250.04 |
| 3,667,082 | 6/1972 | Hoyler | 15/250.24 |

FOREIGN PATENTS OR APPLICATIONS

| 1,545,841 | 10/1968 | France | 15/250 A |
| 773,199 | 4/1957 | United Kingdom | 15/250.26 |
| 11,883 | 1/1901 | Sweden | 15/250.24 |

*Primary Examiner*—Peter Feldman
*Attorney, Agent, or Firm*—Fleit & Jacobson

[57] ABSTRACT

A headlight wiper is disclosed comprising a stationary body, a carriage mounted for reciprocating movement along a guide way formed in said body, a rotary member mounted in said carriage and serving to carry a generally cylindrical brush, which may be rotated about its longitudinal axis by said member, and a motor-operated drive mechanism for moving the carriage along the guide way and imparting a rotary movement to the rotary member. The drive mechanism includes two concentric wheels of mutually different diameter, both connected to the rotary member, and an endless drive means, such as a chain, cable, rope or belt, having two substantially parallel parts extending each on one side of the common rotary axis of said wheels and arranged in engagement each with one of said wheels.

2 Claims, 3 Drawing Figures

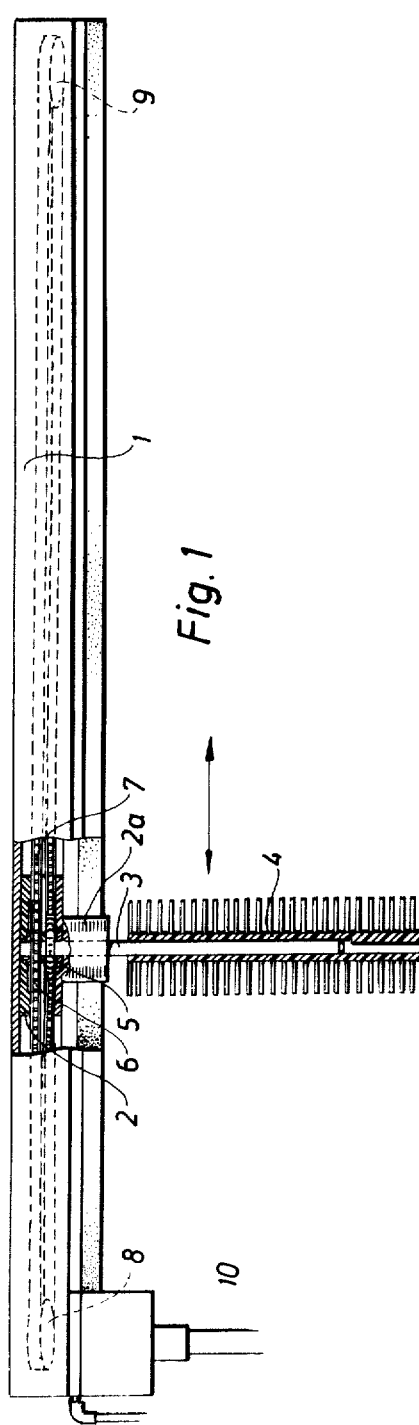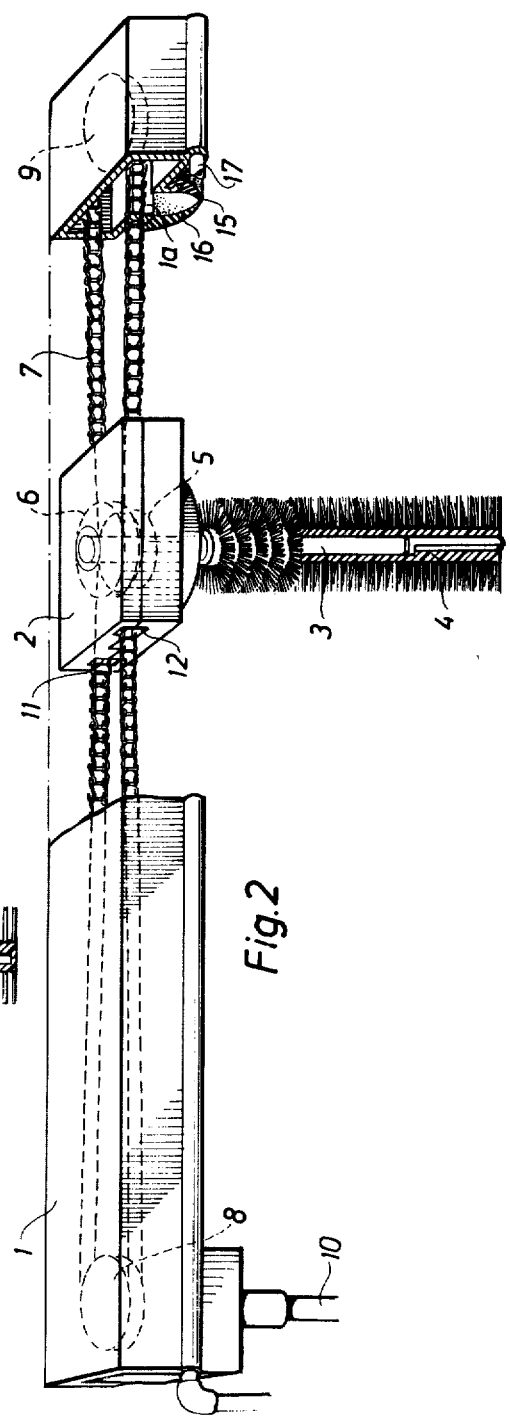

HEADLIGHT WIPER

The present invention relates to a headlight wiper which is especially intended for use with headlights having a substantially rectangular lens. It should, however, be noted that the headlight wiper according to the invention may be utilized in connection with other types of headlights. For instance, it may advantageously be used at vehicles having two circular headlights mounted close together at each side of the front of the vehicle, in which case a single headlight wiper may serve to clean the lenses of both said headlights.

More particularly, the invention relates to a headlight wiper of the kind comprising a stationary body, a carriage mounted for reciprocating movement along a guide way formed in said body, a rotary member mounted in said carriage and serving to carry a generally cylindrical brush, which may be rotated about its longitudinal axis by said member, and a motor-operated drive mechanism for moving the carriage along the guide way and imparting a rotary movement to the rotary member.

A wiper of said type is previously known through FIG. 5 and the appurtenant descriptive parts of U.S. Pat. No. 3,667,082.

The invention has for its object to provide an improved headlight wiper of said type. Especially, an object of the invention is to provide an improved motor-operated drive mechanism for such a wiper.

The main characteristics of the invention consist in that the drive mechanism includes two concentric wheels of mutually different diameter, both connected to the rotary member, and an endless drive means, such as a chain, cable, rope or belt, having two substantially parallel parts extending each on one side of the common rotary axis of said wheels and arranged in engagement each with one of said wheels.

As a result of the difference in diameter between the two wheels, which in the most simple case may be rigidly mounted on the rotary member carrying the brush, the endless drive means, formed by a chain, cable, rope or belt, will function not only to rotate said wheels and the brush-carrying rotary member but also to cause a linear movement of the carriage along the guide way formed in the stationary body.

The ratio between the rotary speed of the brush-carrying rotary member and the rate of movement of the carriage along the guide way will depend on the selection of the diameters of the two wheels provided in engagement with the endless drive means. If the difference in diameter between said wheels is small, the peripherical speed of the brush will be very high as compared to the rate of linear movement of the carriage, whereby the wiper will become extremely efficient.

According to a preferred embodiment of the invention the drive mechanism may further include a safety clutch serving to protect the wiper against damage due to any possible mechanical overload.

Below an embodiment of the invention will be described, by way of example, reference being had to the accompanying diagrammatic drawings, in which:

FIG. 1 shows a front view, partly in section, of a headlight wiper according to said embodiment of the invention;

FIG. 2 is a perspective view of the wiper according to FIG. 1, wherein portions of the stationary body of the wiper have been cut away for the purpose of clarity in illustration.

Figure 3:
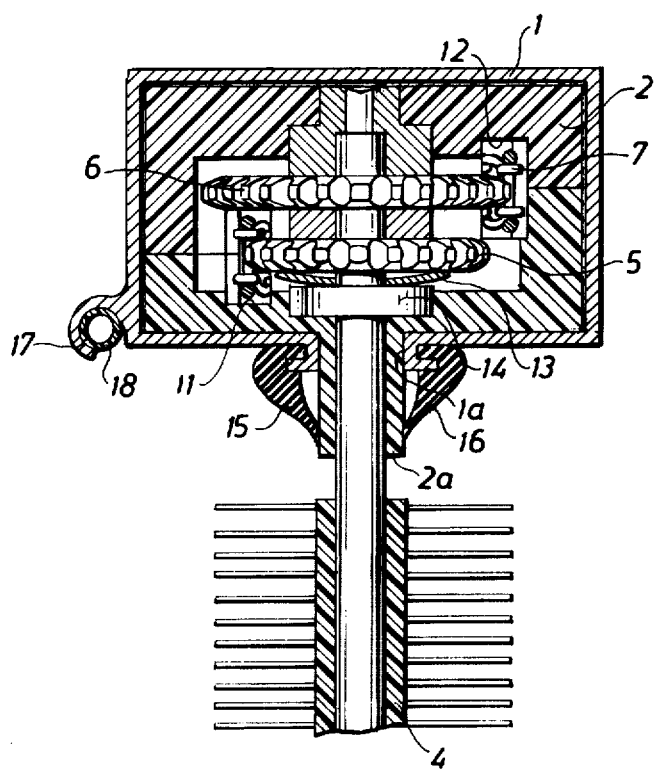
FIG. 3 shows a cross-sectional view, on an enlarged scale, of the wiper according to FIG. 1.

The headlight wiper shown in the drawings comprises an elongated stationary body 1 intended to be mounted in a fixed position on a vehicle in any suitable manner. In the illustrated embodiment, said body 1 has the general shape of a tubular member of rectangular cross-section having a longitudinally extending opening 1a in its bottom wall. The inner surface of body 1 forms a guide way for a reciprocable carriage 2 in which a vertical shaft 3 is rotatably mounted. Said shaft 3 extends downwardly from the carriage 2 through the longitudinal opening 1a and serves to carry a substantially cylindrical brush 4 which may be detachably mounted on shaft 3. Within an inner cavity in the carriage 2 two chain wheels, or sprockets 5 and 6 are mounted on shaft 3. Said sprockets are arranged in frictional engagement with shaft 3 by means of a safety clutch, including a disc spring 13 mounted on shaft 3 between the lower sprocket 5 and a flange 14 rigidly connected to shaft 3. Reference numeral 7 designates an endless chain extending with two substantially parallel parts between two chain wheels 8 and 9 mounted each at one end of the elongated body 1. Of said chain wheels the one designated 8 is arranged to be driven from an electric motor (not shown) by means of a Bowden-cable 10 connected to said wheel. The other chain wheel 9 is mounted freely rotatable in the body 1.

As can be seen from the drawings, the two sprockets 5 and 6 mounted on shaft 3 have mutually different diameters and consequently, also mutually different number of teeth for receiving the links of chain 7. The carriage 2 is provided with through passages 11 and 12 for the respective parts of chain 7. As shown in FIGS. 2 and 3, said passages 11 and 12 are located so as to cause the two chain parts to extend on opposite sides of shaft 3 and on different levels whereby one chain part will engage sprocket 5 while the other chain part will be in engagement with sprocket 6. The above arrangement results in that, when the chain 7 is driven by the motor connected to the chain over cable 10, the chain will not only impart a rotary movement to shaft 3 and brush 4 but also, as a consequence of the difference in diameter and number of teeth between the two sprockets 5 and 6, bring the carriage 2 to move along the guide way formed in the stationary body 1.

The operation of the wiper may be controlled in any suitable manner and by any suitable means. For instance, the wiper may be provided with limit switches at each end of the guide way in the stationary body 1 to brake the current supply to the drive motor or to reverse the direction of rotation of the motor when the cariage 2 reaches an end position.

As can be seen from the drawings, the carriage 2 is provided with a projection 2a extending through the longitudinal opening 1a in the bottom wall of body 1 and surrounding a portion of shaft 3. Said projection which suitably may have a generally elliptical outer profile, cooperates with rubber strips 15 and 16 serving to prevent the entry of dust or moisture into the interior of body 1.

As can be seen best from FIG. 3, the body 1 carries at its lower front edge a longitudinally extending tube 17 having openings 18 for spraying water against the brush 4 and the headlight lens (not shown) located behind said brush.

The brush 4 may preferably be moulded in one piece from a suitable plastic material, in which case it may be produced at very low cost, whereby the necessary regular replacement of worn-out brushes will become inexpensive.

In the illustrated embodiment the carriage 2 has been assumed to consist of two separate pieces of moulded plastic material fixed together by any suitably means.

Naturally, the invention is not restricted to the embodiment above described. Thus, many different modifications are feasible within the scope of the invention.

What is claimed is:

1. A headlight wiper comprising a stationary body, a carriage mounted for reciprocating movement along a guide way formed in said body, a roatary member mounted in said carriage and serving to carry a generally cylindrical brush, which may be rotated about its longitudinal axis by said member, and a motor-operated drive mechanism for moving the carriage along the guide way and imparting a rotary movement to the rotary member, characterized in that said drive mechanism includes two concentric wheels of mutually different diameter, both connected to the rotary member, and an endless drive means, such as a chain, cable, rope or belt, having two substantially parallel parts extending each on one side of the common rotary axis of said wheels and arranged in engagement each with one of said wheels.

2. A headlight wiper according to claim 1, characterized in that the drive mechanism further includes a safety clutch.

* * * * *